United States Patent
Wozniak et al.

(10) Patent No.: US 11,010,093 B2
(45) Date of Patent: May 18, 2021

(54) DELEGATING AN ACCESS REQUEST TO ADDRESS LOAD IMBALANCES IN A DISPERSED STORAGE NETWORK

(71) Applicant: International Business Machines Corporation, Armonk, NY (US)

(72) Inventors: Ethan S. Wozniak, Park Ridge, IL (US); Praveen Viraraghavan, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/249,590

(22) Filed: Jan. 16, 2019

(65) Prior Publication Data
US 2020/0225871 A1    Jul. 16, 2020

(51) Int. Cl.
G06F 3/06 (2006.01)
G06F 11/10 (2006.01)
G06F 3/16 (2006.01)

(52) U.S. Cl.
CPC .......... *G06F 3/0659* (2013.01); *G06F 3/067* (2013.01); *G06F 3/0613* (2013.01); *G06F 11/1076* (2013.01)

(58) Field of Classification Search
None
See application file for complete search history.

(56) References Cited

U.S. PATENT DOCUMENTS

| | | | |
|---|---|---|---|
| 8,352,954 B2* | 1/2013 | Gokhale | G06F 9/5016 718/105 |
| 8,688,949 B2 | 4/2014 | Resch et al. | |
| 9,794,337 B2 | 10/2017 | Peake et al. | |
| 9,836,352 B2 | 12/2017 | Resch et al. | |
| 10,523,237 B2* | 12/2019 | Li | H03M 13/6356 |
| 2003/0182348 A1* | 9/2003 | Leong | G06F 9/4856 718/100 |
| 2008/0208361 A1* | 8/2008 | Grgic | G05B 19/41865 700/2 |

(Continued)

OTHER PUBLICATIONS

Guo et al., A Novel Security Network Storage System Based on Internet, IEEE, Conference Paper, pp. 1123-1127. (Year: 2009).*

*Primary Examiner* — April Y Blair
*Assistant Examiner* — Dipakkumar B Gandhi
(74) *Attorney, Agent, or Firm* — James Nock; Andrew D. Wright; Roberts Calderon Safran & Cole, P.C.

(57) ABSTRACT

A method begins by obtaining a set of load level information regarding a set of dispersed storage (DS) processing units of a plurality of sets of DS processing units of the DSN. The method continues by determining whether the first DS processing unit has a load imbalance based on the set of load level information. When the first DS processing unit has the load imbalance, the method continues by determining whether to delegate a first access request of one or more access requests to another DS processing unit. When determining to delegate the first access request, the method continues by determining a delegate DS processing unit of the set of DS processing units based on the set of load level information. The method continues by instructing the first DS processing unit to send the first access request to the delegate DS processing unit for processing.

14 Claims, 7 Drawing Sheets

(56) References Cited

U.S. PATENT DOCUMENTS

| | | | |
|---|---|---|---|
| 2010/0094967 A1* | 4/2010 | Zuckerman | H04L 67/1002 709/219 |
| 2010/0094981 A1* | 4/2010 | Cordray | H04L 41/20 709/222 |
| 2014/0208154 A1* | 7/2014 | Gladwin | G06F 11/073 714/6.12 |
| 2015/0052354 A1* | 2/2015 | Purohit | G06F 21/6218 713/165 |
| 2016/0255150 A1* | 9/2016 | Dhuse | G06F 3/067 709/213 |
| 2017/0286154 A1 | 10/2017 | Baptist et al. | |

* cited by examiner

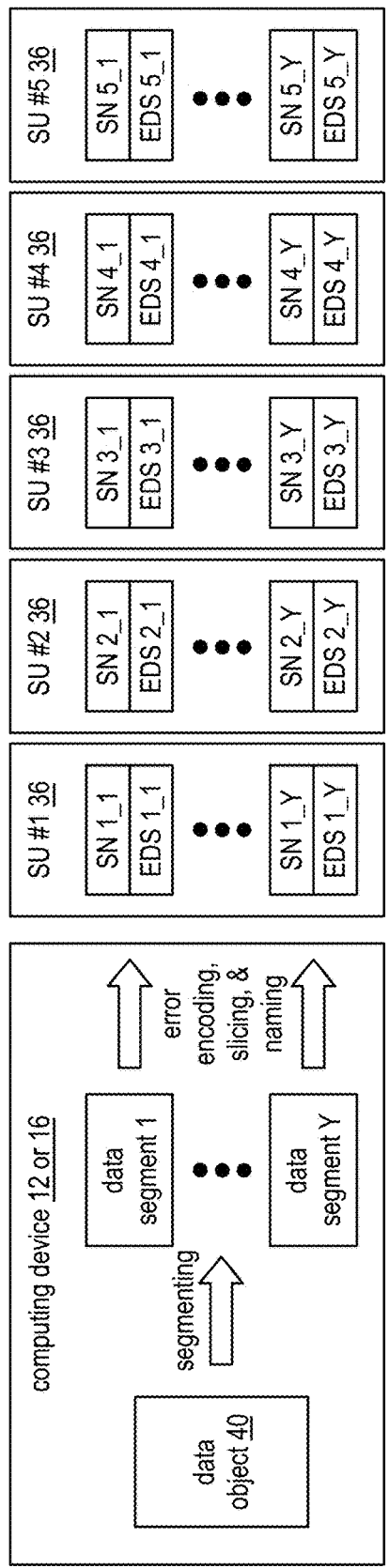
FIG. 3
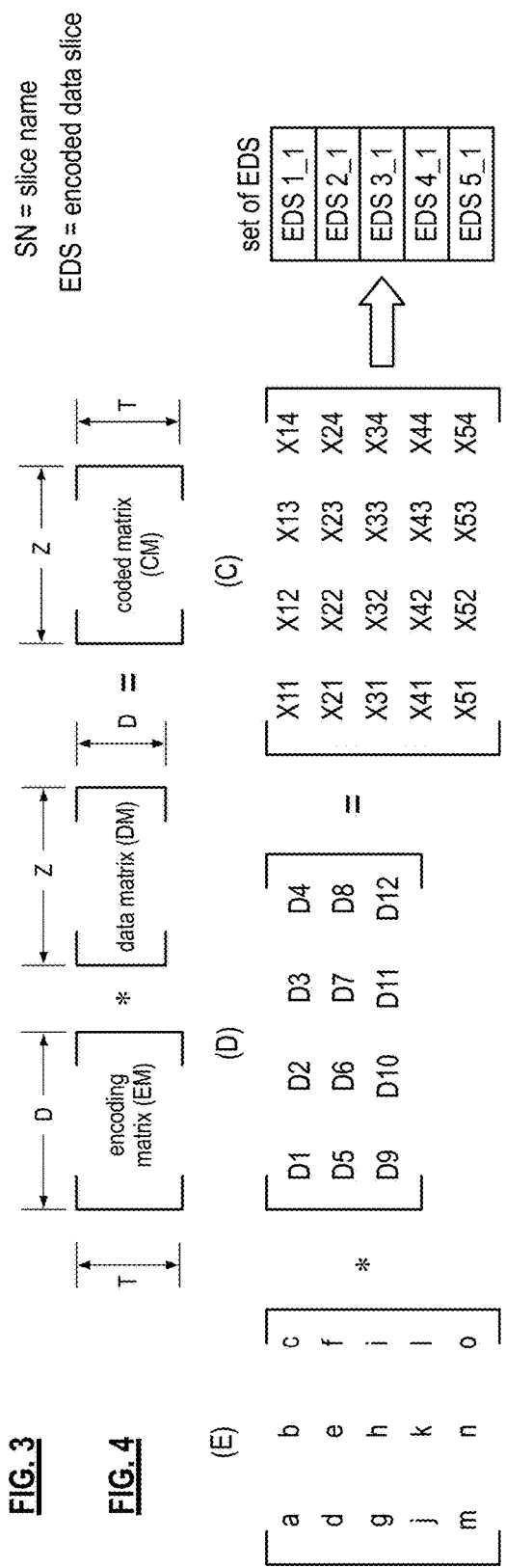
FIG. 4
FIG. 5
FIG. 6

| load level info 94 | | |
|---|---|---|
| resource ID | #1 | |
| CPU load | 17% | |
| network load | 83% | |
| memory load | 22% | |
| reserved | | |

| | load level info 94 | | | |
|---|---|---|---|---|
| resource ID | #1 | #2 | ••• | #n |
| CPU load | 17% | 78% | ••• | 44% |
| network load | 83% | 88% | ••• | 76% |
| memory load | 22% | 91% | ••• | 56% |

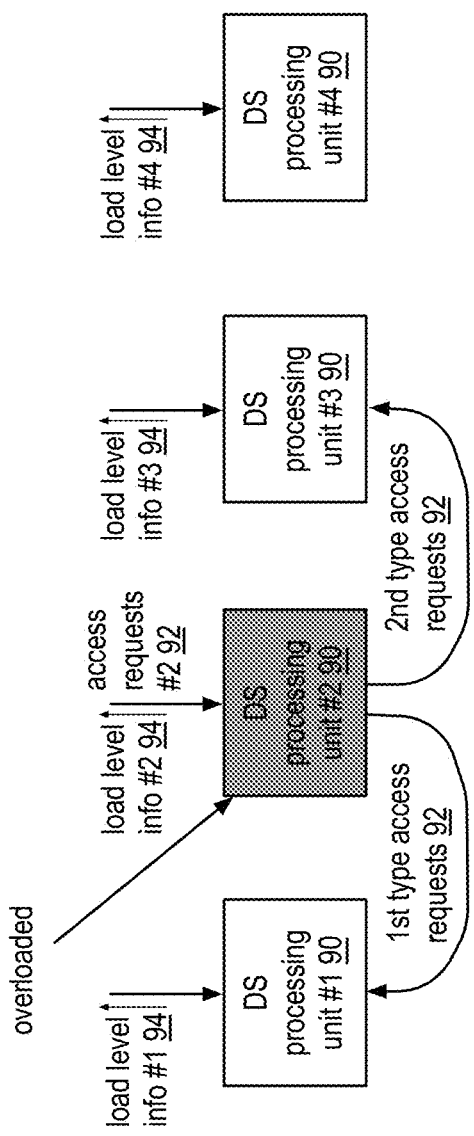
FIG. 11
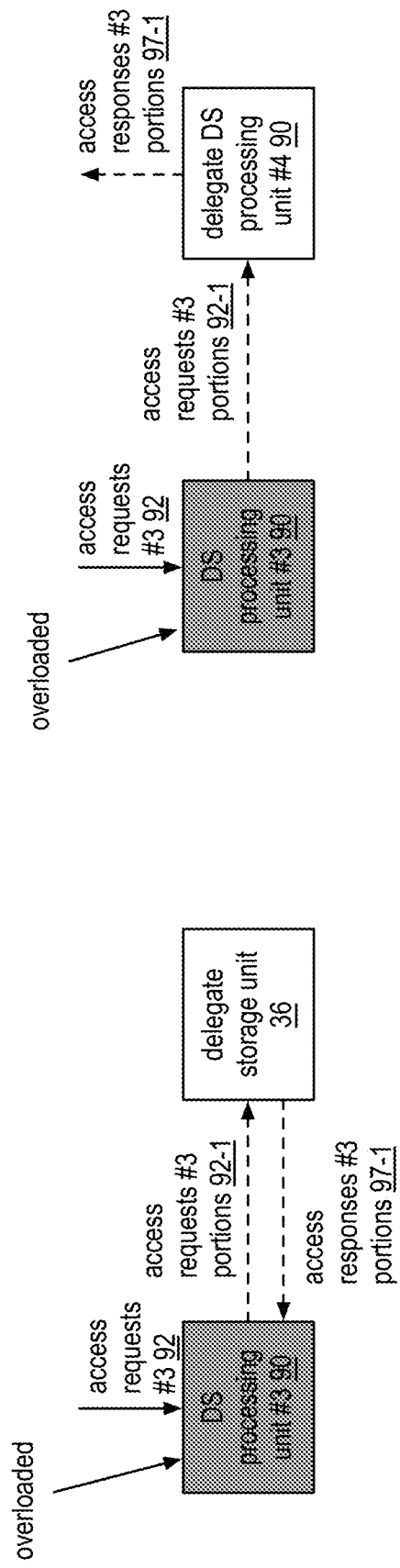
FIG. 12A
FIG. 12B

DELEGATING AN ACCESS REQUEST TO ADDRESS LOAD IMBALANCES IN A DISPERSED STORAGE NETWORK

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to processing access requests.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 11 is a schematic block diagram of an example of delegating access requests 92 based on the type of access request in accordance with the present invention;

Figure 13:
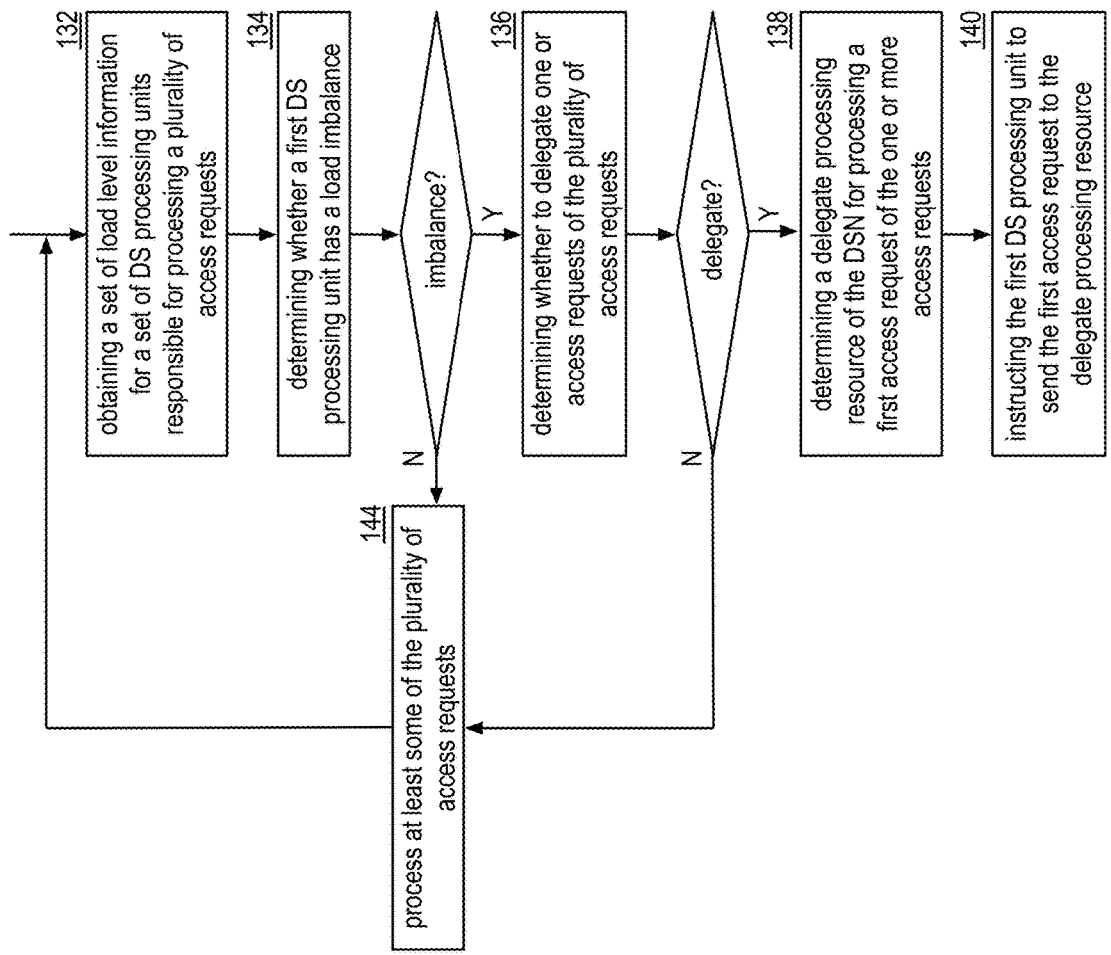

FIGS. 12A and B are schematic block diagrams of examples of delegating a portion of access requests in a dispersed storage network (DSN) in accordance with the present invention; and FIG. 13 is a flowchart illustrating an example of delegating access requests in a dispersed storage network (DSN) in accordance with the present invention.

DETAILED DESCRIPTION OF THE INVENTION

Figure 1:
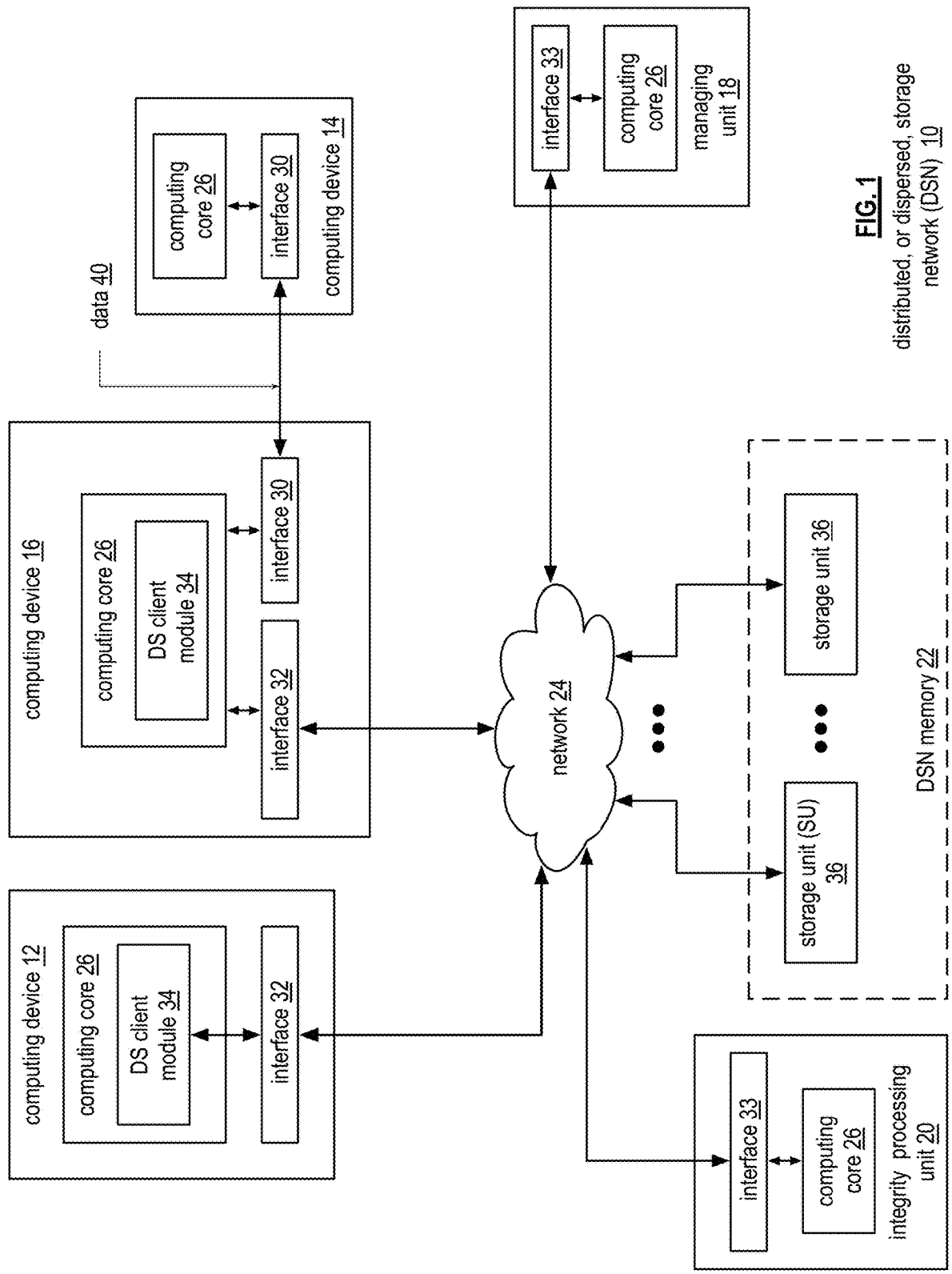
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
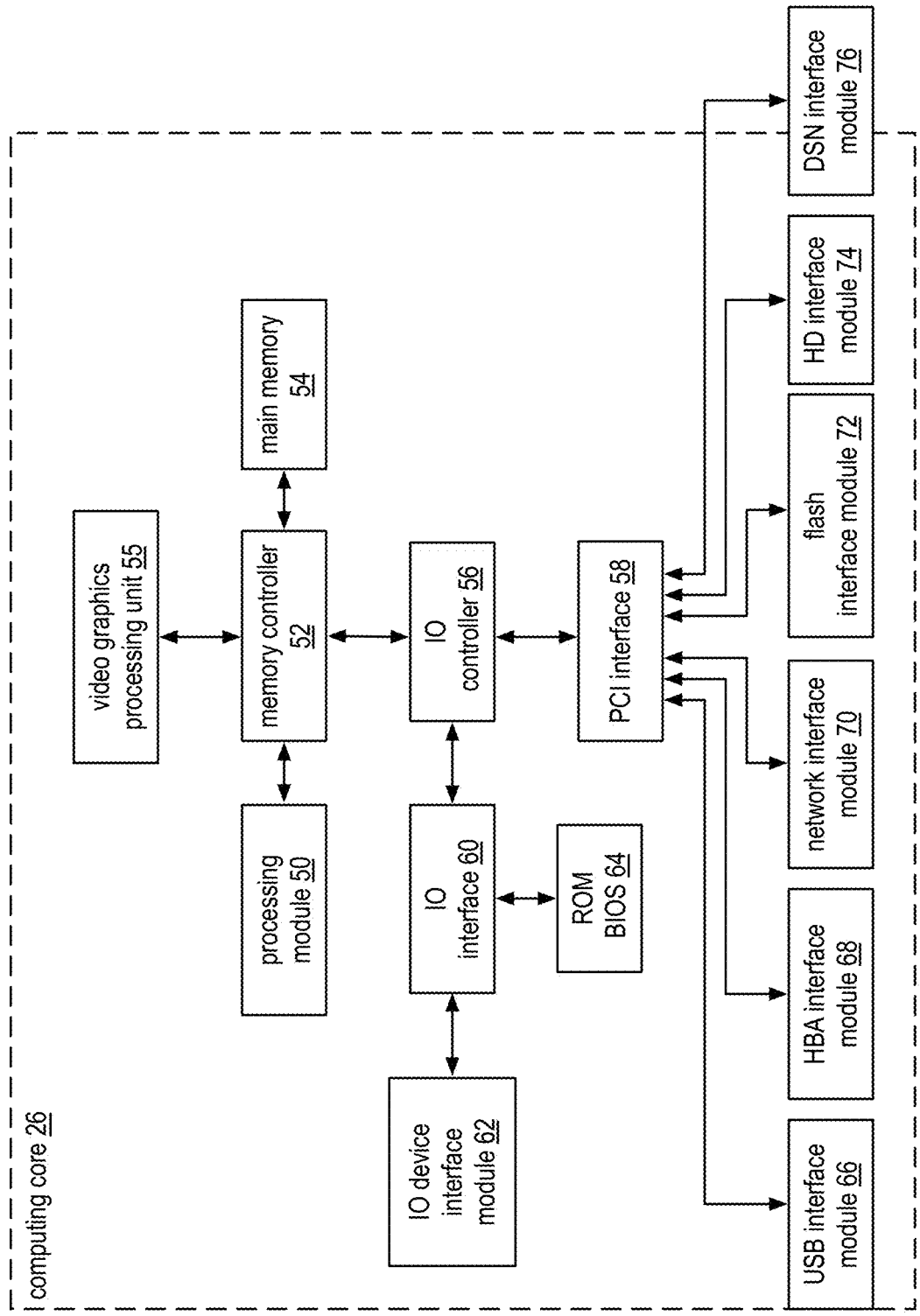
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
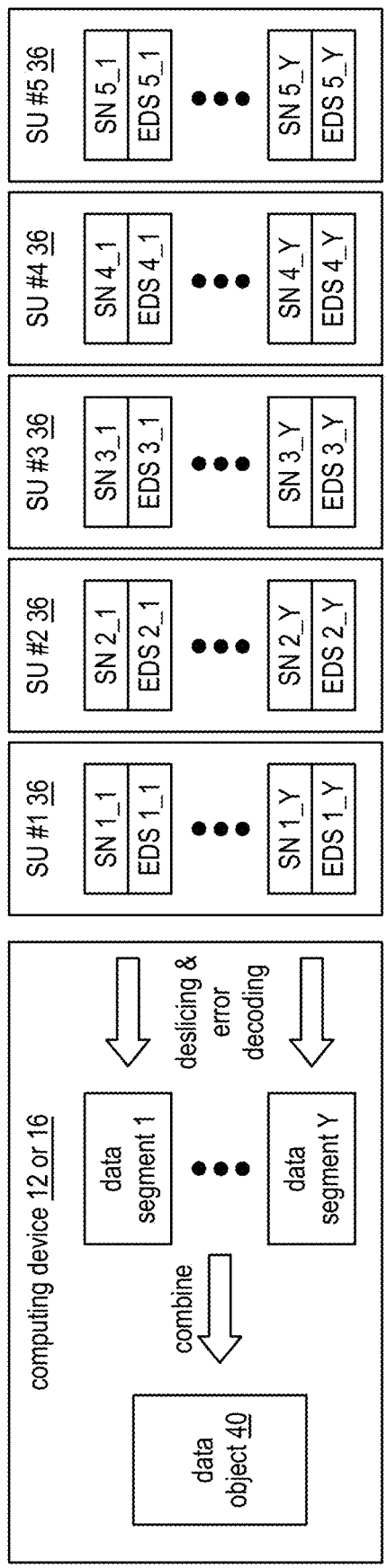
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
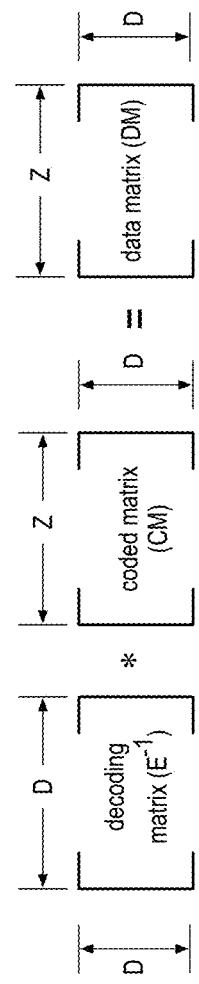
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figures 9A, 9B, 10:
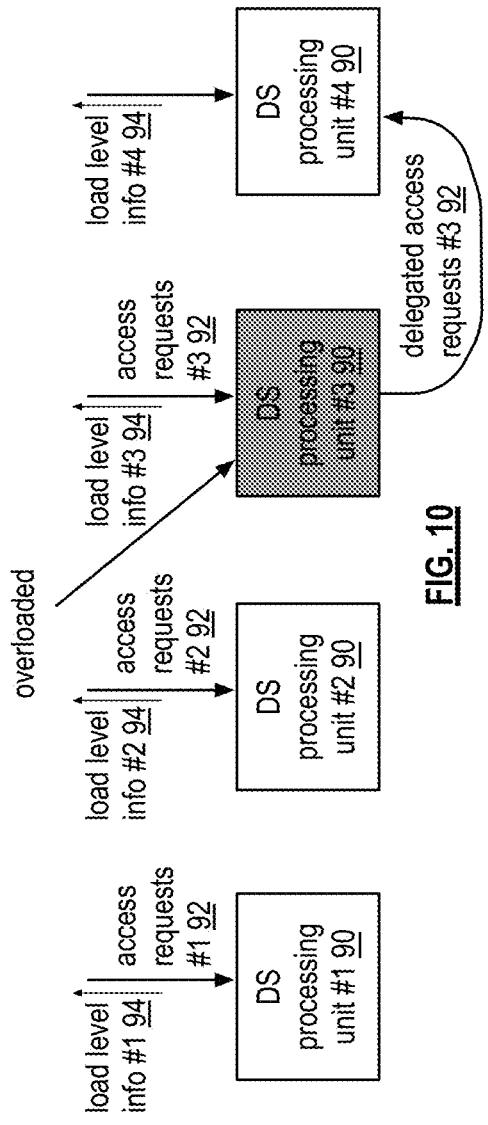
FIGS. 9A and 9B is a schematic block diagrams of examples of load level information in accordance with the present invention.
FIG. 10 is a schematic block diagram of an example of a set of DS processing units 90 of a dispersed storage network (DSN) in accordance with the present invention.

FIGS. 9A and 9B is a schematic block diagrams of examples of load level information 94. The load level information includes one or more load levels of one or more resources (e.g., DS processing unit, storage unit, etc.) of a dispersed storage network (DSN). As a specific example of the one or more load levels for a resource (e.g., as shown in FIG. 9A), the load level information 94 for the resource includes a resource identification (ID) (e.g., #1), a central processing unit (CPU) load, a network load, and a memory load. In this example, the load level information 94 may also include other fields. For example, the other fields includes one or more of a reserved field, CPU load threshold, network load threshold, memory load threshold, an anticipated CPU load, anticipated network load, anticipated memory load, a historical latency to other resources (e.g., DS processing units, storage units, etc.), and a predicted latency to other resources.

FIG. 9B illustrates an example of the load level information 94 that includes information of a plurality of resources of the DSN. For example, the load level information 94 indicates that for a first resource ID (e.g., #1), the CPU load is low (e.g., 17%) and a network load is high (e.g., 83%). Thus, the load level information 94 indicates that the first resource is able to perform certain additional high computational requests (e.g., requests that use the CPU of the first resource, and that don't dramatically affect the network load, without effecting other requests being handled by the first resource).

For example, a computing device inspects an access request for processing by the first resource and determines, based on the load level information and the access request, that the first resource can process the request (e.g., processing of the access request will not cause any of the load levels to exceed a load level threshold).

As another example, the computing device inspects a second request and determines that the first resource cannot process the second request without exceeding a load level threshold. When the network load is above a threshold level, the computing device utilizes the load level information to determine whether to delegate a request (e.g., part of a current request or a pending request) from the overloaded resource to another resource of the DSN. The delegation process is discussed in further detail with reference to FIGS. 10-13.

As a specific example, a second access request is received by resource #2. A computing device of the DSN determines that the second access request will increase the memory load level 3%, increase the network load level 3%, and increase the CPU load 7%. In this example, the resource #2 has a load level thresholds of CPU load at 90%, network load at 90%, and memory load of 95%. The computing device determines based on the load level information that the network load level for resource #2 will exceed the network load level threshold by processing the second access request.

The computing device then determines to delegate the second access request to another resource (e.g., resource #1) of the DSN. For example, the computing device obtains load level information for one or more other resources of the DSN and determines, based on the load level information for the one or more other resources, to delegate the second access request to the first resource (e.g., resource #1).

FIG. 10 is a schematic block diagram of an example of a set of DS processing units 90 of a dispersed storage network (DSN). The set of DS processing units are operable to process access requests 92 (e.g., write, read, list, rebuild, etc.) and to delegate one or more of the access requests to other DS processing units within the DSN. The set of DS processing units #1-4 90 receive access requests 92. Each DS processing unit has one or more loads associated with its performance capabilities (e.g., to process access requests). A DS processing unit is operable to create, store and/or share the loads as load level information. The set of DS processing units #1-4 90 are also operable to send load level information 94 to other devices of the DSN. For example, a first DS processing units #1 90 may send load level info #1 94 to a second DS processing unit #2 90. In another example, a first DS processing unit may share knowledge of other DS processing units' load levels according to a gossip protocol (e.g., dissemination protocol, anti-entropy protocol, etc.). As access requests 92 are received by the DS processing units, loads across the set may become unequal. In an example, the unequal load results in a less than desired (e.g., maximum, above a threshold) performance the set of DS processing units. When the unequal load impacts the performance of the DSN, a computing device of the DSN may determine to balance or transfer some of the load to increase performance of the DSN.

In an example of transferring load amongst a set of DS processing units when there is unequal load levels across the set of dispersed storage (DS) processing units (e.g., to improve utilization and performance of the DSN), some access requests (or portions thereof) of a DS processing unit that is overloaded (e.g., DS processing unit #3 90) are delegated to another DS processing unit (e.g., DS processing units #1, 2 and 4). For example, the other DS processing unit(s) completes the work for the access request and forwards a response to the access request either to the original DS processing unit or another computing device (e.g., a storage unit, another DS processing unit, etc). In an example, a computing device of the DSN (e.g., a DS processing unit of the set of DS processing units) determines when it is beneficial to delegate requests to other DS processing units through querying other DS processing units of the set of DS processing units and comparing respective load levels associated with the set of DS processing units.

A DS processing unit may experience different levels of load than other DS processing units of the set of DS processing units for various reasons. As a first example, the DS processing unit experiences different levels of load than other DS processing units due to load balancing imperfections. As a second example, the DS processing unit experiences different levels of load than other DS processing units due to a low rate of very costly computational or storage requests (making load balancing difficult). As a third example, the DS processing unit experiences different levels of load than other DS processing units due to one or more of the DS processing units having degraded hardware.

In an example, the imbalances in load level leads to suboptimal performance of the DSN, as all resources (e.g., DS processing units, storage units, managing units, etc.) are not used effectively. For example, a latency for processing access requests at DS processing units that are overloaded is higher than a threshold. As another example, an overall throughput may be lower than otherwise possible. To address these and other issues, DS processing units delegate client computational or storage requests (e.g., access requests) to other DS processing units, which reduces their load.

As a specific example, a DS processing unit #3 90 delegates an access request #3 92 to DS processing unit #4 90 for processing. The delegate DS processing unit #4 90 undertakes the resource intensive operations involved in processing the access request #3 92. For example, the resource intensive operations includes one or more of error coding functions, encryption, verifying data through checksums, communicating with the DS units (e.g., storage units), and other functions. The DS processing unit #4 then forwards the response to the access request to the original DS processing unit (e.g., DS processing unit #3 90) to be passed to the client device, or sends the response directly to the client device.

In an example, to determine when it is beneficial to delegate requests, the DS processing units query other DS processing units for their current load levels. The load levels could include CPU utilization, memory utilization, network utilization or other information. This querying may be determined on one or more of an ongoing periodic basis or on demand when the DS processing unit's load level exceeds a threshold. To reduce the number of queries that must be made to identify DS processing units with low load levels, in response to queries, DS processing units could report both their own load level as well as their knowledge of other DS processing units' load levels (e.g., using a gossip protocol).

In one example, a DS processing unit has a low load level (e.g., lower than a historical average, lower than a threshold, sufficient resources to process additional access requests, etc). Here, the DS processing unit sends a delegation request to another DS processing unit requesting that a portion of the access requests the other DS processing unit receives be delegated to the DS processing unit. In one example, one or more of the DS processing units inspects client requests and determines which type of resource they are likely to need (e.g. CPU, memory, network). The client requests are then routed to a DS processing unit with a relatively low load for that type of resource. The delegating access requests according to the type of access request is discussed in further detail in FIGS. 11-13.

The DS processing units considered for delegation also include DS processing units running on DS units (e.g., storage units) to make use of their resources even if those DS processing units are not configured to receive requests directly from client devices. In an example, the delegation to storage units can be especially beneficial in heavy write workloads where there is a high expansion factor of the network throughput due to the error coding function, while the maximum network throughput of the DS processing unit's network device throughput limit is symmetric. In this case, a DS processing unit could accept more data from client devices than it could write to storage units, due to the expansion factor of the error coding function. By delegating some or all of the access requests to other DS processing units or storage units, higher throughput can be supported when load levels are unequal.

FIG. 11 is a schematic block diagram of an example of delegating access requests 92 based on the type of access request. A type of access request includes one or more of a write request, a read request, a list request and a rebuild request. In this example, a second DS processing unit #2 90 is determined to be overloaded. The determining is based on one or more of load level information from the second DS processing unit and on load level information of other DS processing units of the DSN. For example, the second DS processing unit determines it is overloaded when a load level is above a threshold load level (e.g., based on the load level information of the second DS processing unit).

As another example, a device (e.g. a computing device) of the DSN may determine that an imbalance of load exists across a plurality of DS processing units based on load level information of the plurality of DS processing units. For example, based on the imbalance, the device determines the second DS processing unit #2 90 is overloaded. For example, the device determines that the CPU load is above a load level threshold for the second DS processing unit. As another example, the device determines that a difference between the network load of the second DS processing unit and the network load of another DS processing unit is above a second threshold.

Having determined that the second DS processing unit is overloaded, a computing device of the DSN determines whether one or more access requests are to be delegated from the second DS processing unit 90 to one or more other DS processing units of the DSN based on the type of access request (e.g., how processing the request affects the load levels of a resource). For example, a first type of access request (e.g., affects the network and CPU load of a DSN resource) of the access requests #2 92 of the second DS processing unit is delegated to a first DS processing unit based on load level information indicating the first DS processing unit has a network and CPU load below a threshold. As another example, a second type of access request (e.g., primarily affects the memory of a DSN resource) of the access requests #2 92 is delegated to a third DS processing unit #3 90 based on load level information indicating an anticipated memory load level for the third DS processing unit is below a memory load threshold.

FIGS. 12A and B are schematic block diagrams of examples of delegating a portion (one or more tasks) of access requests in a dispersed storage network (DSN). As shown in FIG. 12A, an overloaded DS processing unit #3 90 receives access requests #3 92 that includes a plurality of access requests #3 portions 92-1 for processing an access request #3 92. A computing device of the DSN determines a delegate storage unit 36 (e.g., a storage unit 36 of FIG. 1) to delegate one or more portions 92-1 of the access request #3 92.

Having determined the delegate storage unit 36, the access request portions 92-1 are sent from the DS processing unit #3 90 to the delegate storage unit 36 for processing. Note the delegation may include a command on where the delegate storage unit is to send a corresponding access request portion 97-1. Having received the access request portions 92-1, the delegate storage unit 36 processes the access request portions 92-1. The delegate storage unit 36 then sends (e.g., according to the command) access response portions 97-1 to the DS processing unit #3 90 or to another device (e.g., another storage unit) of the DSN. For example, when the access request is a write request, the access responses portion 97-1 may include an indication of storage status of one or more encoded data slices associated with the write request.

FIG. 12B shows a similar delegation as FIG. 12A, with the delegate processing resource being a delegate DS processing unit (e.g., delegate DS processing unit #4) instead of a delegate storage unit 36.

FIG. 13 is a flowchart illustrating an example of delegating access requests in a dispersed storage network (DSN). The method begins at step 132, where a computing device (e.g., a DS processing unit, a computing device 12-16 of FIG. 1) of the DSN obtains a set of load level information for the set of DS processing units. The set of load level information includes information regarding the set of DS processing unit's ability to process the plurality of access requests. Note the DSN includes a plurality of sets of DS processing units that includes the set of DS processing units. Further note an access request of the plurality of access requests is regarding one or more encoded data slices.

In an example, a first DS processing unit of the set of DS processing unit has first load level information of the set of load level information. The first load level information includes one or more load levels regarding processing capabilities of the first DS processing unit for processing one or more access requests of the plurality of access requests. For example, the load level information includes one or more of a central processing unit (CPU) utilization load level, a memory utilization load level, and a network utilization load level. Note other load levels or information that indicate the ability of a set of DS processing units to process the plurality of access requests may also be included in the load level information.

For example, the load level information includes one or more of DS processing unit and storage unit availability, historical information, and scheduled maintenance. Further note the obtaining may be done on a periodic basis or when a load level of a DS processing unit exceeds a load level threshold. For example, a first DS processing unit has a network utilization load level of 82% (above an 80% threshold), as such, the computing device obtains load level information for at least some of the set of DS processing units (e.g., the first DS processing unit and other DS processing units) to determine if a delegation of current or future access requests is predicted to reduce the network utilization load level of the first DS processing unit.

Having obtained the set of load level information, the method continues with step 134, where the computing device determines whether the first DS processing unit has a load imbalance based on the set of load level information. As an example, the load imbalance is determined when the first DS processing unit above a threshold. As another example, the load imbalance is determined when a difference of corresponding loads across a set of DS processing units is above a threshold. As yet another example, the load imbalance is determined when loads (e.g., aggregate for the set, load of a first DS processing unit of the set) of a first set of DS processing units are above a threshold difference than loads of a second set of DS processing units.

When the first DS processing unit does not have the load imbalance, the method branches to step 144, where the first DS processing unit processes at least some of the plurality of access requests. When the first DS processing unit has the load imbalance, the method continues to step 136, where the computing device determines whether to delegate a first access request of the one or more access requests. In one example, the determining is based on whether delegating improves the performance of the set of DS processing units. For example, the determining may be based on determining that the delegation will reduce a predicted latency for the set of DS processing units to process the first access request. As another example, the determining may be based on determining that the delegation will increase a predicted throughput for the set of DS processing units.

When the computing device determines not to delegate, the method continues to step 144. When the computing device determines to delegate, the method continues to step 138, where the computing device determines a delegate processing resource of the DSN for processing an access request based on the set of load level information. Note the set of load level information may further include load levels of one or more sets of storage units and the delegating processing resource may be one of a DS processing unit, a managing unit, and a storage unit.

The determining may also be based on a type of the access request and information in included in the access request (e.g., dispersed data storage parameters for a set of encoded data slices). For example, when the type of access request is a write request and includes a high (e.g., 18/10 (pillar width to decode) threshold or greater) expansion factor (e.g., based on the dispersed data storage parameters) the computing device ranks (e.g., by score (e.g., using a deterministic function)) a storage unit higher than a DS processing unit with similar load levels (e.g., both having similar network load levels) and delegates the write request to the storage unit. As another example, when the type of access request is a write request and includes a low (e.g., 14/10 or lower) expansion factor, the computing device ranks a DS processing unit above a storage unit with similar load levels and delegates the write request to the DS processing unit. As yet another example, when the type of access request is a write request, the computing device determine to delegate the access request to a highest ranking storage unit. Note a storage unit may be determined as the delegate processing resource for any type (e.g., list, read, write, etc.) of access request to improve the functioning (e.g. throughput) of the DSN.

Having determined the delegate processing resource, the method continues with step 140, where the computing device instructs the first DS processing unit to send the access request to the delegate processing resource for processing. Having delegated the first access request, the method may loop back to step 134 where computing device determines whether the first DS processing units has a load imbalance. Alternatively, the method loops back to step 132, where the computing device obtains the set of load level information (e.g., an updated set of load level information).

Note the above steps may be implemented by a computer readable storage medium that includes at least one memory section that stores operational instructions that, when executed by a processing system of a dispersed storage network (DSN) that includes a processor and a memory, causes the processing system to perform one or more of the above steps.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN) comprises:
    obtaining a set of load level information regarding a set of dispersed storage (DS) processing units of a plurality of sets of DS processing units of the DSN, wherein the set of load level information includes storage unit availability, historical information, and scheduled maintenance and the set of DS processing units process a plurality of access requests, wherein a first DS processing unit of the sets of DS processing units has a first load level information of the set of load level information, wherein the first load level information includes one or more load levels regarding processing capabilities of the first DS processing unit for processing one or more access requests of the plurality of access requests, wherein an access request of the plurality of access requests is regarding one or more encoded data slices of a set of encoded data slices, and wherein a data segment of data is dispersed storage error encoded into the set of encoded data slices;
    determining whether the first DS processing unit has a load imbalance based on the set of load level information;
    determining whether to delegate a second access request of the one or more access requests which includes error coding functions, encryption, verifying data through checksums, and communicating with the plurality of sets of DS processing units, wherein the determination is based on determining the second access request is a write request and information included in the second access request includes dispersed data storage parameters for the set of encoded data slices;
    when the first DS processing unit has the load imbalance:
        determining whether to delegate a first access request of the one or more access requests;
    when delegating the first access request:
        determining a delegate DS processing unit of the set of DS processing units based on the set of load level information; and
        instructing the first DS processing unit to send the first access request to the delegate DS processing unit for processing; and
    when delegating the second access request:
        determining a storage unit of a set of storage units based on the set of load level information, wherein the set of load level information further includes one or more load levels of the storage unit and load levels of other storage units of the set of storage units shared by the storage unit using an anti-entropy protocol gossip protocol; and
        instructing the first DS processing unit to send the second access request to the storage unit for processing.

2. The method of claim 1, wherein a load level information of the set of load level information includes one or more of:
    a central processing unit (CPU) utilization load level;
    a memory utilization load level; and
    a network utilization load level.

3. The method of claim 1, wherein the determining whether to delegate the first access request includes one or more of:
    determining the delegating the first access request reduces a latency for the set of DS processing units to process the first access request; and
    determining the delegating the first access request increases a throughput for the set of DS processing units.

4. The method of claim 1, wherein the obtaining the set of load level information includes one or more of:
    obtaining the load level information on a periodic basis; and
    obtaining the load level information when a load level of a DS processing unit of the set of DS processing units exceeds a load level threshold.

5. The method of claim 1, wherein the delegate DS processing unit is determined by:
    determining resource requirements for the first access request;
    determining, based on the set of load level information, one or more DS processing units of the set of DS processing units have the resource requirements; and
    selecting a DS processing unit of the one or more DS processing units as the delegate DS processing unit.

6. The method of claim 5, wherein the resource requirements include one or more of:
    an amount of central processing unit (CPU) utilization needed for processing the first access request;
    an amount of memory utilization needed for processing the first access request; and
    an amount of network utilization needed for processing the first access request.

7. The method of claim 1, wherein the when delegating the first access request further comprises:
    determining a type of the first access request is a write request for storing the data segment;
    determining an expansion factor based on dispersed data storage parameters of the dispersed storage error encoding the data segment into the set of encoded data slices;
    determining resource requirements for the first access request based on the type and the expansion factor;
    determining whether a first storage unit of the set of storage units has resource requirements for processing one or more portions of the first access request; and
    when the first storage unit has the resource requirements to:
        instruct the first DS processing unit to send at least one portion of the one or more portions to the storage unit for processing.

8. A computing device of a dispersed storage network (DSN) comprises:
    memory;
    an interface; and
    a processing module operably coupled to the memory and the interface, wherein the processing module is operable to:
        obtain a set of load level information regarding a set of dispersed storage (DS) processing units of a plurality of sets of DS processing units of the DSN, wherein the set of load level information includes storage unit availability, historical information, and scheduled maintenance and the set of DS processing units process a plurality of access requests, wherein a first DS processing unit of the set of DS processing units has a first load level information of the set of load level information, wherein the first load level information includes one or more load levels regarding processing capabilities of the first DS processing unit for processing one or more access requests of the plurality of access requests, wherein an access request of the plurality of access requests is regarding one or more encoded data slices of a set of encoded data slices, and wherein a data segment of data is dispersed storage error encoded into the set of encoded data slices;

determine whether the first DS processing unit has a load imbalance based on the set of load level information;

determine whether to delegate a second access request of the plurality of access requests which includes error coding functions, encryption, verifying data through checksums, and communicating with the plurality of sets of DS processing units, wherein the determination is based on determining the second access request is a write request and information included in the second access request includes dispersed data storage parameters for the set of encoded data slices;

when the first DS processing unit has the load imbalance:

determine whether to delegate a first access request of the one or more access requests;

when delegating the first access request:

determine a delegate DS processing unit of the set of DS processing units based on the set of load level information; and instruct the first DS processing unit to send the first access request to the delegate DS processing unit for processing; and when delegating the second access request:

determining a storage unit of a set of storage units based on the set of load level information, wherein the set of load level information further includes one or more load levels of the storage unit and load levels of other storage units of the set of storage units shared by the storage unit using an anti-entropy protocol gossip protocol; and instruct the first DS processing unit to send the second access request to the storage unit for processing.

9. The computing device of claim 8, wherein a load level information of the set of load level information includes one or more of:

a central processing unit (CPU) utilization load level;
a memory utilization load level; and
a network utilization load level.

10. The computing device of claim 8, wherein the processing module is operable to determine whether to delegate the first access request by one or more of:

determining the delegating the first access request reduces a latency for the set of DS processing units to process the first access request; and determining the delegating the first access request increases a throughput for the set of DS processing units.

11. The computing device of claim 8, wherein the processing module is operable to obtain the set of load level information by one or more of:

obtaining the load level information on a periodic basis; and obtaining the load level information when a load level of a DS processing unit of the set of DS processing units exceeds a load level threshold.

12. The computing device of claim 8, wherein the processing module is operable to determine the delegate DS processing unit by:

determining resource requirements for the first access request;

determining, based on the set of load level information, one or more DS processing units of the set of DS processing units have the resource requirements; and selecting a DS processing unit of the one or more DS processing units as the delegate DS processing unit.

13. The computing device of claim 12, wherein the resource requirements include one or more of:

an amount of central processing unit (CPU) utilization needed for processing the first access request;

an amount of memory utilization needed for processing the first access request; and an amount of network utilization needed for processing the first access request.

14. The computing device of claim 8, wherein the processing module, when delegating the first access request, is further operable to:

determine a type of the first access request is a write request for storing the data segment;

determine an expansion factor based on dispersed data storage parameters of the dispersed storage error encoding the data segment into the set of encoded data slices;

determine resource requirements for the first access request based on the type and the expansion factor;

determine whether a first storage unit of the set of storage units has resource requirements for processing one or more portions of the first access request; and when the first storage unit has the resource requirements to:

instruct the first DS processing unit to send at least one portion of the one or more portions to the storage unit for processing.

* * * * *